(12) United States Patent
Kim et al.

(10) Patent No.: US 8,594,219 B2
(45) Date of Patent: Nov. 26, 2013

(54) TRANSPOSED STRUCTURE FOR CYCLIC DELAY DIVERSITY (CDD) BASED PRECODING

(75) Inventors: Byoung-Hoon Kim, Seoul (KR); Taesang Yoo, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1259 days.

(21) Appl. No.: 12/109,068

(22) Filed: Apr. 24, 2008

(65) Prior Publication Data

US 2008/0287075 A1 Nov. 20, 2008

Related U.S. Application Data

(60) Provisional application No. 60/914,031, filed on Apr. 25, 2007.

(51) Int. Cl.
*H04B 7/02* (2006.01)
*H04L 1/02* (2006.01)

(52) U.S. Cl.
USPC ........... 375/267; 375/260; 375/299; 375/347; 375/261; 375/264; 455/500; 455/101

(58) Field of Classification Search
USPC ................. 375/260, 261, 264, 267, 299, 347; 455/500, 101
See application file for complete search history.

(56) References Cited

U.S. PATENT DOCUMENTS

2007/0211822 A1* 9/2007 Olesen et al. ................. 375/299
2009/0010149 A1 1/2009 Lee et al.

FOREIGN PATENT DOCUMENTS

| EP | 2119038 A1 | 11/2009 |
|---|---|---|
| KR | 20070021917 | 2/2007 |
| RU | 2196392 C2 | 1/2003 |
| WO | WO9735449 A2 | 9/1997 |
| WO | WO2004019447 | 3/2004 |
| WO | WO2004107693 A1 | 12/2004 |
| WO | WO2007024913 | 3/2007 |

OTHER PUBLICATIONS

Dammann A et al: "Beamforming in Combination With Space-Time Diversity for Broadband OFDM Systems" ICC 2002. 2002 IEEE International Conference on Communications. Conference Proceedings. New York, NY, Apr. 28-May 2, 2002: [IEEE International Conference on Communications], New York, NY: IEEE. US, vol. 1, (Apr. 28, 2002), p. 165-171.
Wing Seng Leon et al: "Combining Eigen-Beamforming and Cyclic Delay Diversity for Correlated MISO Channels With Block-Iterative GDFE Receiver" VTC 2006-Spring. 2006 IEEE 63RD Vehicular Technology Conference May 7-10, 2006 Melbourne, VIC., Australia, pp. 2221-2225. VTC 2006-Spring. 2006 IEEE 63RD Vehicular Technology Conference (IEEE Cat. No. 06CH37716) IEEE Piscataway, NJ. USA.

(Continued)

*Primary Examiner* — Phuong Phu
(74) *Attorney, Agent, or Firm* — Liem T. Do

(57) ABSTRACT

Systems and methodologies are described that facilitate applying cyclic delay diversity (CDD) and precoding to wireless transmissions. In particular, data vectors to be transmitted to a number of receive antennas of a receiver can be transformed to a virtual antenna domain. CDD can be applied to this domain followed by precoding to allow the benefits of precoding to remain though CDD is applied. In this regard, the resulting signals can be transmitted without pouring transmission energy into null spaces unreachable by receiving devices.

24 Claims, 9 Drawing Sheets

(56) References Cited

OTHER PUBLICATIONS

Wing Seng Leon et al: "Cyclic Delay Diversity for Single Carrier-Cyclic Prefix Systems" 2005 39th Asilomar Conference on Signals, Systems and Computer Oct. 30-Nov. 2, 2005 Pacific Grove, CA, USA, pp. 519-523, 2005 39th Asilomar Conference on Signals, Systems and Computer (IEEE Cat. No. 05CH37761) IEEE Piscataway, NJ, USA.
International Search Report—PCT/US08/061630,International Search Authority—European Patent Office—Aug. 5, 2008.
Written Opinion—PCT/US08/061630, International Search Authority—European Patent Office—Aug. 5, 2008.

"3rd Generation Partnership Project; Technical Specification Group Radio Access Network; Physical Channels and Modulation" (Release 8), 3GPP TS 36.211 V1.0.0 (Mar. 2007).
"Description of Single and Multi Codeword Schemes with Precoding", 3GPP TSG-RAN WG1 #44, R1-060457, Feb. 13-17, 2006 Denver, USA.
"LTE MIMO AH Summary" 3GPP TSG RAN WG1 Meeting #48, R1-071228, St. Louis, USA, Feb. 12-16, 2007.
"Link Analysis of 4×4 CDD Based Precoding", 3GPP TSG-RAN WG1 #48bis, R1-071285, Mar. 26-30, 2007, St. Julian's, Malta.
"High Delay CDD in Rank Adapted Spatial Multiplexing Mode for LTE DL" TSG-RAN WG1 #48bis, R1-071601, St. Julian, Malta, Mar. 26-30, 2007.
Taiwan Search Report—TW097115438—TIPO—Sep. 27, 2011.
Qualcomm Europe: "Precoding Structure for DL MIMO—Further Aspects", 3GPP TSG-RAN WG1#47,R1-063438, Nov. 10, 2006.

* cited by examiner

TRANSPOSED STRUCTURE FOR CYCLIC DELAY DIVERSITY (CDD) BASED PRECODING

CROSS-REFERENCE TO RELATED APPLICATIONS

This application claims the benefit of U.S. Provisional Patent application Ser. No. 60/914,031 entitled "A METHOD AND APPARATUS FOR TRANSPOSED STRUCTURE FOR CYCLIC DELAY DIVERSITY (CDD) BASED PRECODING" which was filed Apr. 25, 2007. The entirety of the aforementioned application is herein incorporated by reference.

BACKGROUND

I. Field

The following description relates generally to wireless communications, and more particularly to transmission precoding in wireless communications networks.

II. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP2, 3GPP long-term evolution (LTE), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

MIMO systems commonly employ multiple ($N_T$) transmit antennas and multiple ($N_R$) receive antennas for data transmission. The antennas can relate to both base stations and mobile devices, in one example, allowing bi-directional communication between the devices oil die wireless network. The base stations can perform precoding of one or more signals to provide beamforming when transmitting the signals. Additionally, base stations (or mobile devices) can employ cyclic delay diversity (CDD) in the physical antennas to introduce spatial diversity into the frequency domain. Thus, a number of antennas can operate with an antenna-specific delay to transmit precoded signals with redundancy and diversity increasing successful decoding at the receiving end. However, since the CDD is applied in the physical antenna domain, in cases when the number of transmit antennas is greater than the number of receive antennas, data streams, or transmission layers, portions of transmission energy are poured into a null space, inaccessible by a receiver, negating many benefits of precoding.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with transposing cyclic delay diversity (CDD) structure to be performed before precoding transmission signals. In one example, signals can be transformed to a virtual antenna domain for applying CDD thereover. Subsequently, the CDD-applied virtual antenna signals can be inversely transformed into a physical antenna layer for precoding. This enables the benefits of precoding to be realized, such as signal direction and other design properties, without pouring energy into a null space where a number of transmit antennas is larger than a number of receive antennas or the number of data streams.

According to related aspects, a method that facilitates applying CDD and precoding to wireless transmissions is provided. The method can comprise transforming a plurality of data vectors related to antennas of a receiver to a virtual antenna domain and applying a CDD matrix to the plurality of data vectors to produce a spatial diversity matrix. The method can additionally include applying a precoding matrix to the spatial diversity matrix to construct a plurality of directional data beams corresponding to a number of transmit antennas.

Another aspect relates to a wireless communications apparatus. The wireless communications apparatus can include at least one processor configured to transform a plurality of data vectors to a virtual antenna domain and apply CDD and precoding matrices thereover to create a plurality of beamformed signals. The wireless communications apparatus can also include a memory coupled to the at least one processor.

Yet another aspect relates to a wireless communications apparatus that facilitates applying CDD and precoding to wireless transmissions. The wireless communications apparatus can comprise means for transforming a plurality of data vectors related to transmission rank to a virtual antenna space. The wireless communications apparatus can additionally include means for applying CDD to the virtual antenna space and means for precoding the CDD applied virtual antenna space to create a plurality of beamformed signals.

Still another aspect relates to a computer program product, which can have a computer-readable medium including code for causing at least one computer to transform a plurality of data vectors related to antennas of a receiver to a virtual antenna domain. The computer-readable medium can also comprise code for causing the at least one computer to apply a cyclic delay diversity (CDD) matrix to the plurality of data vectors to produce a spatial diversity matrix. Moreover, the computer-readable medium can comprise code for causing the at least one computer to apply a precoding matrix to the spatial diversity matrix to construct a plurality of directional data beams corresponding to a number of transmit antennas.

To the accomplishment of the foregoing and related ends, the one or more embodiments comprise the features herein-after fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
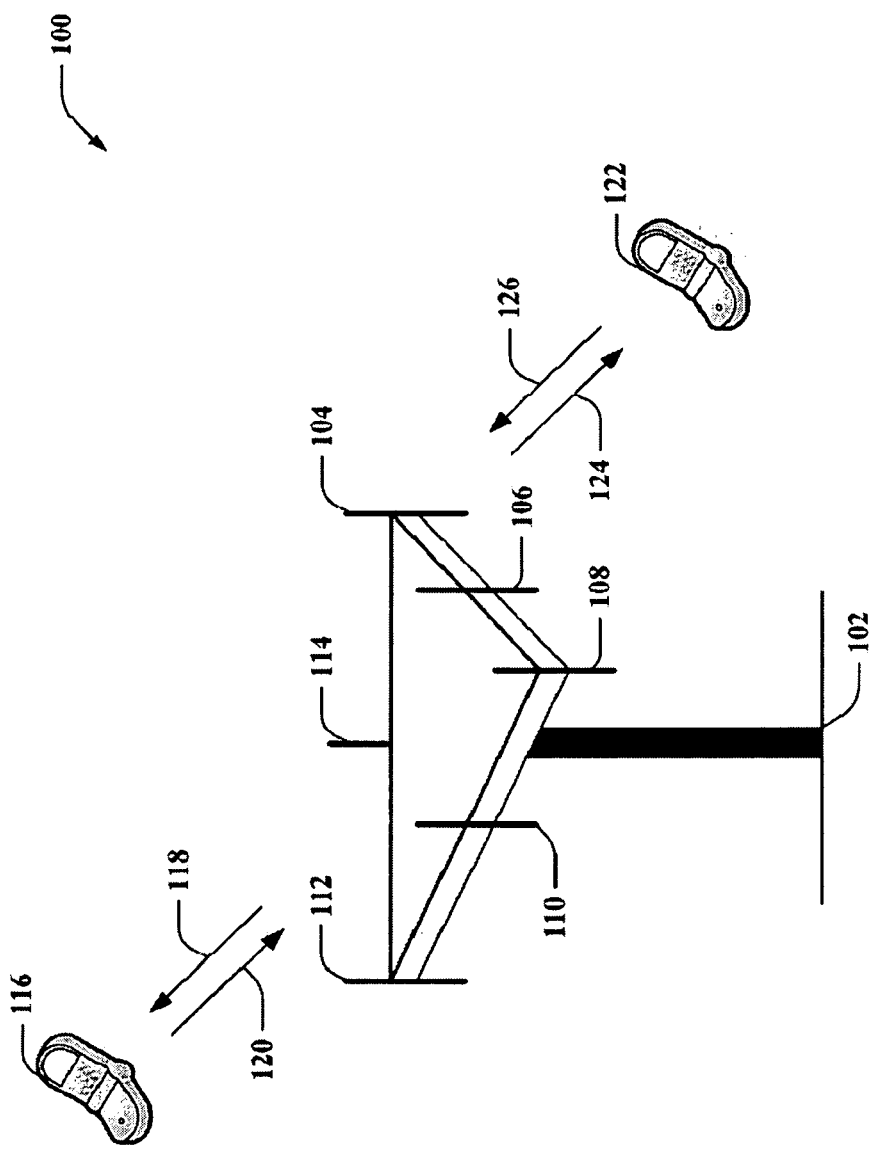
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) can be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device(s) and can also be referred to as an access point, Node B, evolved Node B (eNode B or eNB), base transceiver station (BTS) or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

The techniques described herein may be used for various wireless communication systems such as code division multiple access (CDMA), time division multiple access (TDMA), frequency division multiple access (FDMA), orthogonal frequency division multiple access (OFDMA), single carrier frequency domain multiplexing (SC-FDMA) and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (LTMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). CDMA2000 and UMB are described in documents from an organization named "3rd Generation Partnership Project 2" (3GPP2).

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. This can be provided by using a precoder to steer signals in desired directions, for example. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices. Moreover, mobile devices 116 and 122 can communicate directly with one another using a peer-to-peer or ad hoc technology in one example.

According to an example, system 100 can be a multiple-input multiple-output (MIMO) communication system. Further, system 100 can utilize substantially any type of duplexing technique to divide communication channels (e.g., forward link, reverse link, . . . ) such as FDD, TDD, and the like. Moreover, the system 100 can apply cyclic delay diversity (CDD) for transmission over the multiple antennas to introduce spatial diversity and redundancy in transmitting. For example, using CDD antenna-specific delay can be applied to the transmission for each antenna. In one example, an initial antenna can transmit without CDD while subsequent antennas can each transmit with different delays to facilitate successful receipt of the transmission.

In one example, the system 100 can transform signals from a physical antenna layer domain to a virtual antenna domain before applying CDD. In this regard, precoding can be performed following CDD to retain benefits of using precoding, such as signal steering directions selected by a channel dependent precoder and other desirable properties. For example, a data layer comprised of a number of layers can be multiplied by a unitary matrix corresponding to the number of layers transforming the data layer into a virtual antenna layer. The result can be multiplied by the CDD matrix to introduce spatial diversity and then by a precoding matrix to steer the transmission into the selected beam directions corresponding to the number of layers.

Figure 2:
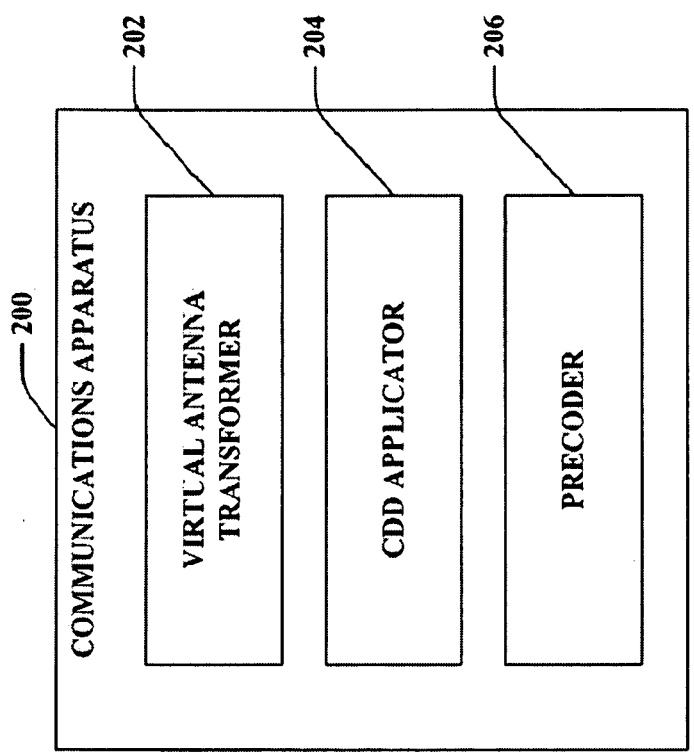
FIG. 2 is an illustration of an example communications apparatus for employment within a wireless communications environment.

Turning to FIG. 2, illustrated is a communications apparatus 200 for employment within a wireless communications environment. The communications apparatus 200 can be a base station or a portion thereof, a mobile device or a portion thereof, or substantially any communications apparatus that receives data transmitted in a wireless communications environment. In particular, the communications apparatus 200 can be an access point that provides wireless communication services to a requesting device. The communications apparatus 200 can include a virtual antenna transformer 202 that can transform physical antenna layer data or signals into one or more virtual antenna signals, a CDD applicator 204 that can apply a CDD operation to the virtual antenna signals, and a precoder 206 that can apply precoding to the CDD-applied signals for beam forming thereof.

In one example, the communications apparatus 200 can have a number of antennas for transmitting data to a receiver with a number of antennas as shown above. Thus, the receiver can have a transmission rank associated with the number of receive antennas, and data to be transmitted can be separated into layers related to the transmission rank. For example, where the receiver has two antennas, the transmission rank can be two, and thus the number of layers for transmitting data can be two as well. The virtual antenna transformer 202 can create a non-diagonal unitary R×R matrix where R is the transmission rank. The data vector to be transmitted can be comprised of R layers as well. The virtual antenna transformer 202 can multiply the data vector by the unitary matrix to transform the data vector into a virtual antenna domain.

Utilizing the virtual antenna domain can allow CDD to be applied before precoding. Thus, the CDD applicator 204 can multiply the matrix produced by file virtual antenna transformer 202 by a diagonal CDD matrix, which can also be an R×R matrix. This operation can introduce spatial diversity on the virtual antennas to facilitate redundant and diverse transmission of data improving probability of successful receipt. Subsequently, the precoder 206 can multiply the CDD-applied matrix by a precoder matrix, which can be $N_T \times R$ where $N_T$ is the number of physical transmit antennas of the communications apparatus 200. In this regard, the antennas can be advantageously steered to R selected beam directions maintaining the benefits of the precoder while still utilizing CDD.

According to an example, the following formula can be used for computing an output data vector for transmission over available transmitting antennas of the communications apparatus 200.

$$x(k) = W_{N_T \times R} \Lambda_{R \times R}(k) U_{R \times R} d(k)$$

where d(k) is the data vector comprising R layers corresponding to the transmission rank, $U_{R \times R}$ is the unitary matrix used by the virtual antenna transformer 202 to spread the data vector over R virtual antennas, $\Lambda_{R \times R}(k)$ is the CDD diagonal matrix utilized by the CDD applicator 204 as described above, and $W_{N_T \times R}$ is the precoding matrix that the precoder 206 can use to steer signals over the $N_T$ transmission antennas of the communications apparatus 200 to the R receive antennas. In this regard, the CDD operation is applied over the R virtual antennas; thus, the transmission power is concentrated over the signal space spanned by the R column vectors of the precoding matrix $W_{N_T \times R}$ using this structure.

Figure 3:
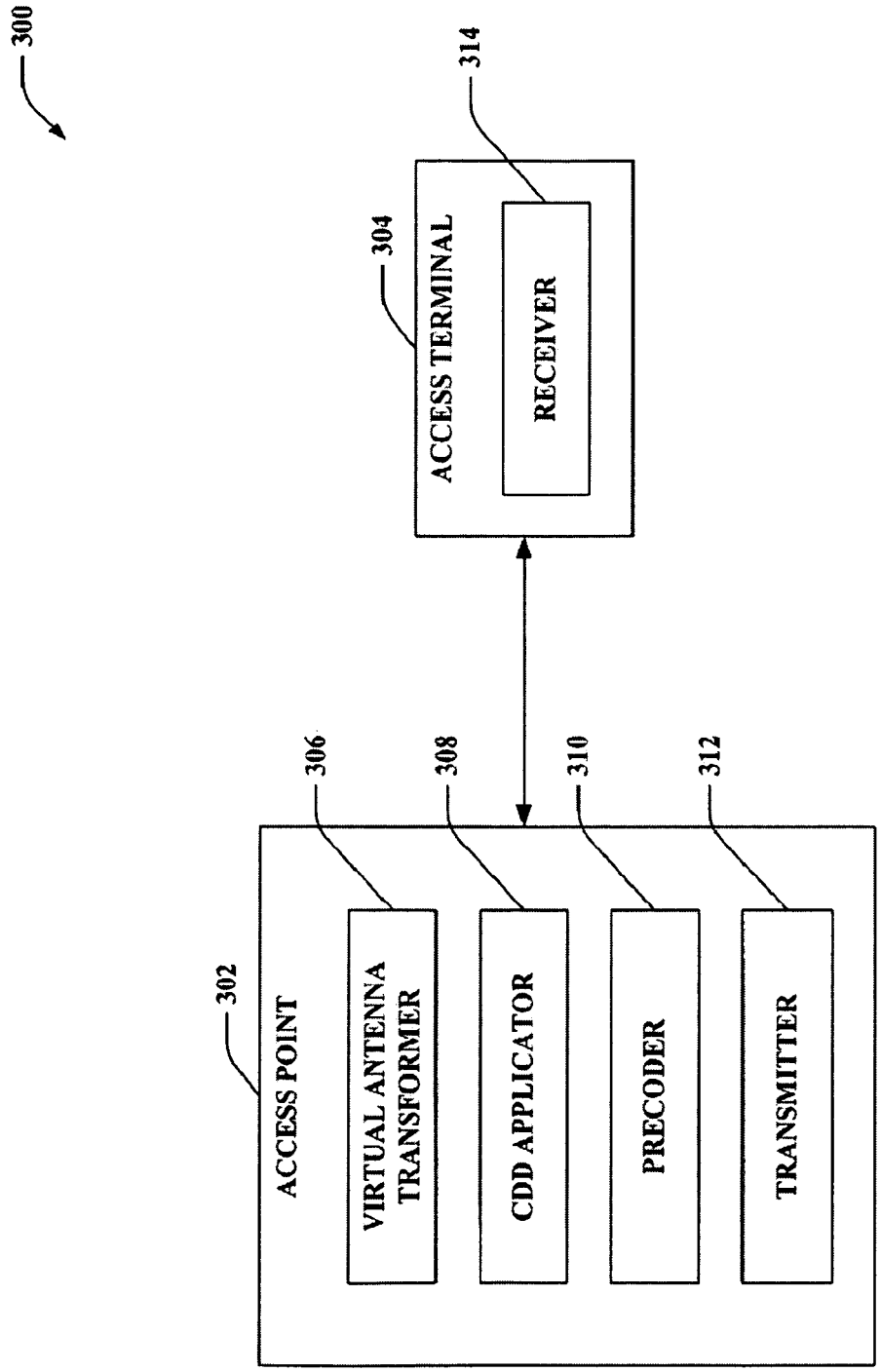
FIG. 3 is an illustration of an example wireless communications system that effectuates applying cyclic delay diversity (CDD) and precoding to wireless communications.

Now referring to FIG. 3, illustrated is a wireless communications system 300 that can facilitate applying CDD to data on one or more virtual antennas for precoding thereof. The system 300 includes an access point 302 that can communicate with an access terminal 304 (and/or any number of disparate devices (not shown)). The access point 302 can transmit information to the access terminal 304 over a forward link channel; further access point 302 can receive information from the access terminal 304 over a reverse link channel. Moreover, system 300 can be a MIMO system utilizing CDD to provide spatial diversity over a frequency space and precoding for desired beamforming. Additionally, the system 300 can operate in an OFDMA wireless network (such as 3 GPP, 3GPP2, 3GPP LTE, etc., for example). Also, the components and functionalities shown and described below in the access point 302 can be present in the access terminal 304 and vice versa, in one example.

The access point 302 includes a virtual antenna transformer 306 that can transform layered data vectors into a virtual antenna domain, which can be a square matrix with dimensions substantially equal to the number of layers (e.g., the transmission rank), in one example. The access point 302 can also include a CDD applicator 308 that can apply spatial diversity to the virtual antenna data matrix, a precoder 310 that can optimally steer transmit directions for the CDD-applied data over available antennas, and a transmitter 312 that can transmit the directional data over the antennas. Thus, die access point 302 can utilize the formula provided above to apply CDD and precoding to data vectors and can transmit the precoded CDD-applied data to the access terminal 304 by utilizing the transmitter 312. The transmitter 312 can transmit the data over available antennas utilizing the steering specified by the precoder 310. Additionally, it is to be appreciated that the access point 302 can restrict available precoder matrices to a given set or single matrix, in one example.

The access terminal 304 can include a receiver 314 that can receive data from the access point 302 through one or more antennas. As described, the number of antennas can correspond to the transmission rank, and thus number of data vectors; additionally, the transmission rank corresponds to the size of the virtual antenna domain created by the virtual antenna transformer 306. The receiver 314 can be of substantially any type, including a successive interference cancellation (SIC) receiver, a linear minimum mean-square error (LMMSE) receiver, and/or the like. According to an example, the access point 302 can apply CDD and precoding according to the type of receiver. For example, the formula shown above, $x(k) = W_{N_T \times R} \Lambda_{R \times R}(k) U_{R \times R} d(k)$, can be utilized with a SIC receiver as such receivers can have higher diversity gains with weaker signals; thus, throughput with respect to non-CDD operations can suffer slight to substantially no loss. However, where the receiver 314 is an LMMSE receiver, a different operation can be desired to mitigate the throughput loss with respect to non-CDD operations, which can be caused at least in part by beam directions being skewed in applying data over the virtual antenna domain. In addition, if the precoding matrix defined by the precoder 310 is designed with a constant modulus property, such that each element of each precoding matrix has the same magnitude, the above formula can affect the constant modulus property, which can result in potentially inefficient power amplifier utilization.

According to an example, where the above formula causes throughput or inefficiency concerns, the CDD applicator 308, or other portion of the access point 302, can apply a Hermitian inverse transformation matrix before precoding. For example, the Hermitian matrix can be the inverse transformation of the unitary matrix applied over the layered data vectors by the virtual antenna transformer 306. In this regard, the following formula can be utilized to perform the various calculations.

$$x(k) = W_{N_T \times R}(U_{R \times R}{}^H \Lambda_{R \times R}(k) U_{R \times R}) d(k)$$

where $d(k)$ is the data vector comprising R layers corresponding to the transmission rank, $U_{R \times R}$ is the unitary matrix used by the virtual antenna transformer 306 to spread the data vector over R virtual antennas, $\Lambda_{R \times R}(k)$ is the CDD diagonal matrix utilized by the CDD applicator 308 described above, $U_{R \times R}{}^H$ is the Hermitian inverse transform matrix of the unitary matrix $U_{R \times R}$ applied to mitigate loss associated with $U_{R \times R}$, and $W_{N_T \times R}$ is the precoding matrix utilized by the precoder 310 to steer signals of $N_T$ transmission antennas of the communications apparatus 200 to the R receive antennas. This formula can be utilized, in one example, where the receiver 314 is an LMMSE receiver. It is to be appreciated that the access point 302 can select a formula based on a type of the receiver 314; this information can be received from the access terminal 304 or other network device, requested by the access point 302, inferred, assumed, hard-coded, read as a parameter, and/or the like. Additionally, $\Lambda_{R \times R}(k)$ can be a fixed matrix based at least in part on one of many factors, including transmission rank, network specification, desired CDD, and/or the like for example. It is to be appreciated that the two formulas described can be substantially equivalent by interpreting $U_{R \times R}{}^H$ as part of the precoder 310 design. For example, $U_{R \times R}{}^H$ can be alternatively performed by a new precoder 310 resulting in the previous formula, $x(k) = W'_{N_T \times R} \Lambda_{R \times R}(k) U_{R \times R} d(k)$, where $W'_{N_T \times R} = W_{N_T \times R} U_{R \times R}{}^H$. Additionally, the formula $W_{N_T \times R} \Lambda_{R \times R}(k) U_{R \times R} d(k)$ can be $W_{N_T \times R} U_{R \times R} (U_{R \times R}{}^H \Lambda_{R \times R}(k) U_{R \times R}) d(k)$, where precoder 310 structure is $W''_{N_T \times R} = W_{N_T \times R} U_{R \times R}$ and $\Lambda_{R \times R}(k) = U_{R \times R}{}^H \Lambda_{R \times R}(k) U_{R \times R}$ resulting in the latter formula $W''_{N_T \times R}(U_{R \times R}{}^H \Lambda_{R \times R}(k) U_{R \times R}) d(k)$.

Figure 4:
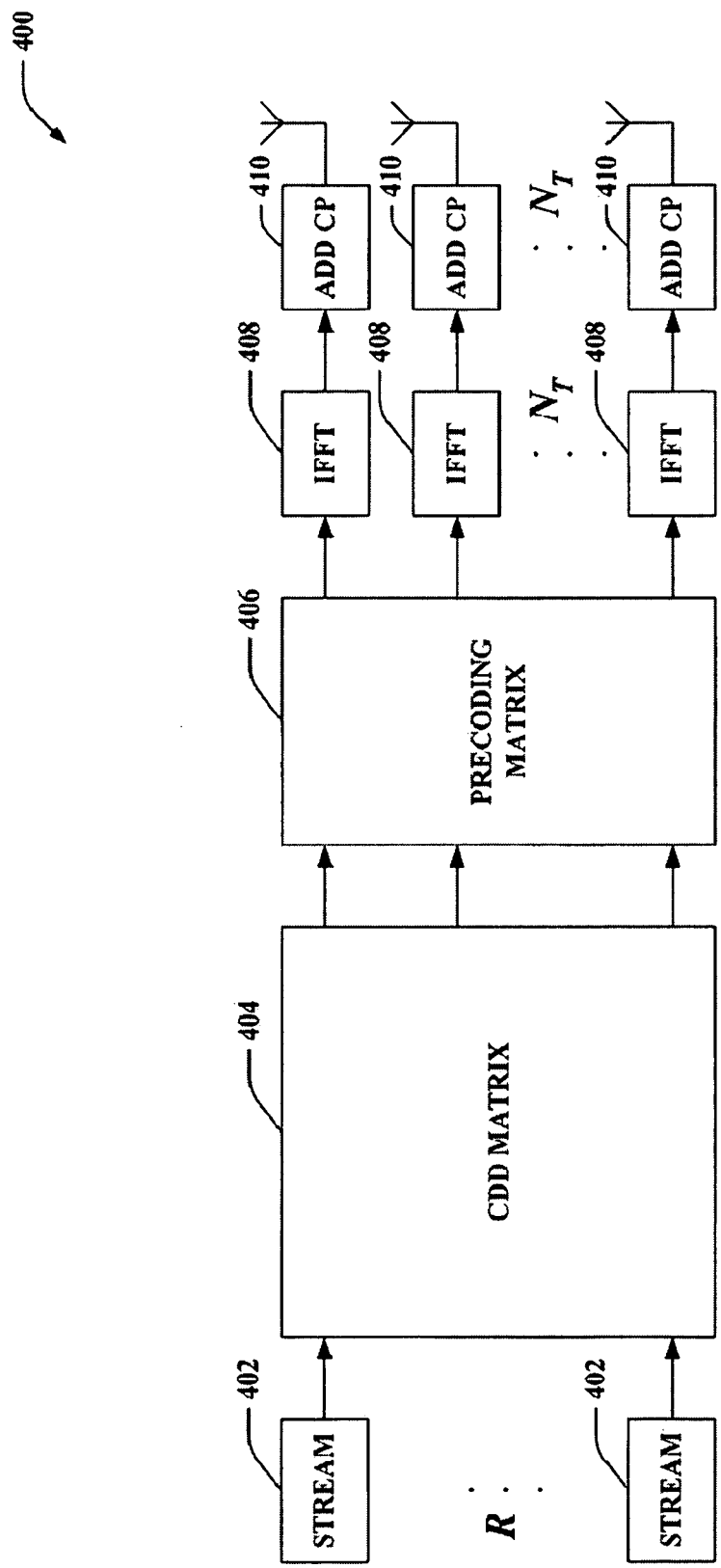
FIG. 4 is an illustration of example operation for applying CDD and precoding to wireless communications.

Now referring to FIG. 4, an example operation 400 that can be performed in accordance with one or more devices or components described herein is shown. The operation 400 can comprise a plurality of computations performed to transform data vectors into one or more transmission signals. In particular, R streams 402 can be layered data vectors related to a number of receive antennas; the number of streams 402 or data vectors can additionally relate to the transmission rank, for example. The streams 402 can be matrix multiplied with a CDD matrix 404 to transform the streams 402 to a virtual antenna domain and apply CDD thereover, the resulting matrix can be multiplied by the precoding matrix 406, as described, to create a vector of $N_T$ signals to transmit over available transmit antennas. Additionally, the resulting vector of signals can have an inverse fast Fourier transform (IFFT) 408 applied to create corresponding OFDM symbols, in one example, as well as cyclic prefix (CP) 410 added to repeat symbol end at the beginning to increase likelihood of successful decoding at the receiver.

In one example, the CDD matrix 404 can be similar to a matrix comprising the matrix product $(\Lambda(k))(U_{R \times R})$ or $(U_{R \times R}{}^H)(\Lambda(k))(U_{R \times R})$, depending on a receiver type and/or constant modulus property as described previously. It is to be appreciated that the matrices multiplied to comprise the CDD matrix 404 can be R×R matrices, where $U_{R \times R}$ is a unitary matrix used to transform the data vectors to a virtual antenna domain, $U_{R \times R}^{H}$ can be the Hermitian inverse transform matrix of the unitary matrix utilized where desired to mitigate distortion, and $\Lambda(k)$, the diagonal CDD application matrix, can be similar to the matrix, $$\begin{bmatrix} 1 & 0 & \cdots & 0 \\ 0 & e^{-j2\pi\delta k} & \cdots & 0 \\ \vdots & \vdots & \ddots & 0 \\ 0 & 0 & 0 & e^{-j2\pi(R-1)\delta k} \end{bmatrix},$$

where the diagonal values relate to the CDD for a given virtual antenna. In this example as well, $\delta$ can be a phase increment parameter of the diagonal CDD matrix; by desirably designing the unitary matrix $U_{R \times R}$ and $\delta$, beam directions and constant modulus property of the precoding matrix 406 (if existent) can be retained.

In one example, for R receive antennas (or R transmission rank), the normalized delay of $\delta$ can be 1/R. In this example, the rank 1 transmission can be unaffected by the CDD operation:

Rank 1: $\delta = 0$, $\Lambda_{R \times R}(k) = [1]$, $U_{R \times R} = [1]$

Rank 2: $\delta = 1/2$, $\Lambda_{R \times R}(k) = \begin{bmatrix} 1 & 0 \\ 0 & e^{-j\pi k} \end{bmatrix}$, $U_{R \times R} = \frac{1}{\sqrt{2}}\begin{bmatrix} 1 & 1 \\ 1 & -1 \end{bmatrix}$ Rank 3: $\delta = 1/3$, $\Lambda_{R \times R}(k) = \begin{bmatrix} 1 & 0 & 0 \\ 0 & e^{-j\frac{2\pi k}{3}} & 0 \\ 0 & 0 & e^{-j\frac{4\pi k}{3}} \end{bmatrix}$, $U_{R \times R} = \frac{1}{\sqrt{3}}\begin{bmatrix} 1 & 1 & 1 \\ 1 & e^{-j\frac{2\pi k}{3}} & e^{-j\frac{4\pi k}{3}} \\ 1 & e^{-j\frac{4\pi k}{3}} & e^{-j\frac{8\pi k}{3}} \end{bmatrix}$ Rank 4: $\delta = 1/4$, $\Lambda_{R \times R}(k) = \begin{bmatrix} 1 & 0 & 0 & 0 \\ 0 & e^{-j\frac{2\pi k}{4}} & 0 & 0 \\ 0 & 0 & e^{-j\frac{4\pi k}{4}} & 0 \\ 0 & 0 & 0 & e^{-j\frac{6\pi k}{4}} \end{bmatrix}$, $U_{R \times R} = \frac{1}{2}\begin{bmatrix} 1 & 1 & 1 & 1 \\ 1 & j & -1 & -j \\ 1 & -1 & 1 & -1 \\ 1 & -j & -1 & j \end{bmatrix}$.

With such, or other carefully chosen $U_{R \times R}$ and $\delta$, $(U_{R \times R}^{H})(\Lambda(k))(U_{R \times R})$ can be a selective virtual antenna permutation (S-VAP) design, which can provide substantially perfect symmetry among active layers R in utilizing the spatial beams. This provides spatial diversity and efficient utilization of changes in channel quality indicator (CQI) related to a quality of received channel data. In this regard, the CDD in the virtual antenna domain can be indirectly implemented with S-VAP.

In another design, for example, a fixed phase increment $\delta$ can be used, such as $\delta = \frac{1}{2}$. For example, where 4 transmit antennas are to transmit to R receive antennas, the R layers of data can be mapped to a number of codewords. In one example, a rank: 1 transmission can be mapped to a codeword, a rank 2 to two codewords, for example. If only 2 codewords are to be used, a rank 3 or greater can split layers into multiple codewords, for example a first codeword can correspond to one layer of data and the other codeword to the remaining two layers, and rank 4 can have two codewords each corresponding to two of the four layers. Thus, the following can be a design for the matrices of the CDD matrix 404 product where $\delta = \frac{1}{2}$.

Rank 1: $\delta = 0$, $\Lambda_{R \times R}(k) = [1]$, $U_{R \times R} = [1]$

Rank 2: $\delta = 1/2$, $\Lambda_{R \times R}(k) = \begin{bmatrix} 1 & 0 \\ 0 & e^{-j\pi k} \end{bmatrix}$, $U_{R \times R} = \frac{1}{\sqrt{2}}\begin{bmatrix} 1 & 1 \\ 1 & -1 \end{bmatrix}$ Rank 3: $\delta = 1/3$, $\Lambda_{R \times R}(k) = \begin{bmatrix} 1 & 0 & 0 \\ 0 & e^{-j\frac{2\pi k}{3}} & 0 \\ 0 & 0 & e^{-j\frac{4\pi k}{3}} \end{bmatrix}$, $U_{R \times R} = \frac{1}{\sqrt{3}}\begin{bmatrix} 1 & 1 & 1 \\ 1 & e^{-j\frac{2\pi k}{3}} & e^{-j\frac{4\pi k}{3}} \\ 1 & e^{-j\frac{4\pi k}{3}} & e^{-j\frac{8\pi k}{3}} \end{bmatrix}$ -continued $$\text{Rank } 4: \delta = 1/4, \Lambda_{R \times R}(k) = \begin{bmatrix} 1 & 0 & 0 & 0 \\ 0 & e^{-j\frac{2\pi k}{4}} & 0 & 0 \\ 0 & 0 & e^{-j\frac{4\pi k}{4}} & 0 \\ 0 & 0 & 0 & e^{-j\frac{6\pi k}{4}} \end{bmatrix}, \quad U_{R \times R} = \frac{1}{2}\begin{bmatrix} 1 & 1 & 1 & 1 \\ 1 & j & -1 & -j \\ 1 & -1 & 1 & -1 \\ 1 & -j & -1 & j \end{bmatrix}.$$

This design can provide spatial diversity order of 4 and 2 for each codeword in a rank 4 and rank 2 transmission; in rank 3, the spatial diversity order of the first codeword, the one corresponding to one layer, can be 2 and that of the other codeword can be higher than 2. This design can work especially well with rank 1, 2, and 4 transmissions with a non-negative change in CQI for a SIC receiver and/or potentially without a change in CQI for LMMSE receiver.

Figure 5:
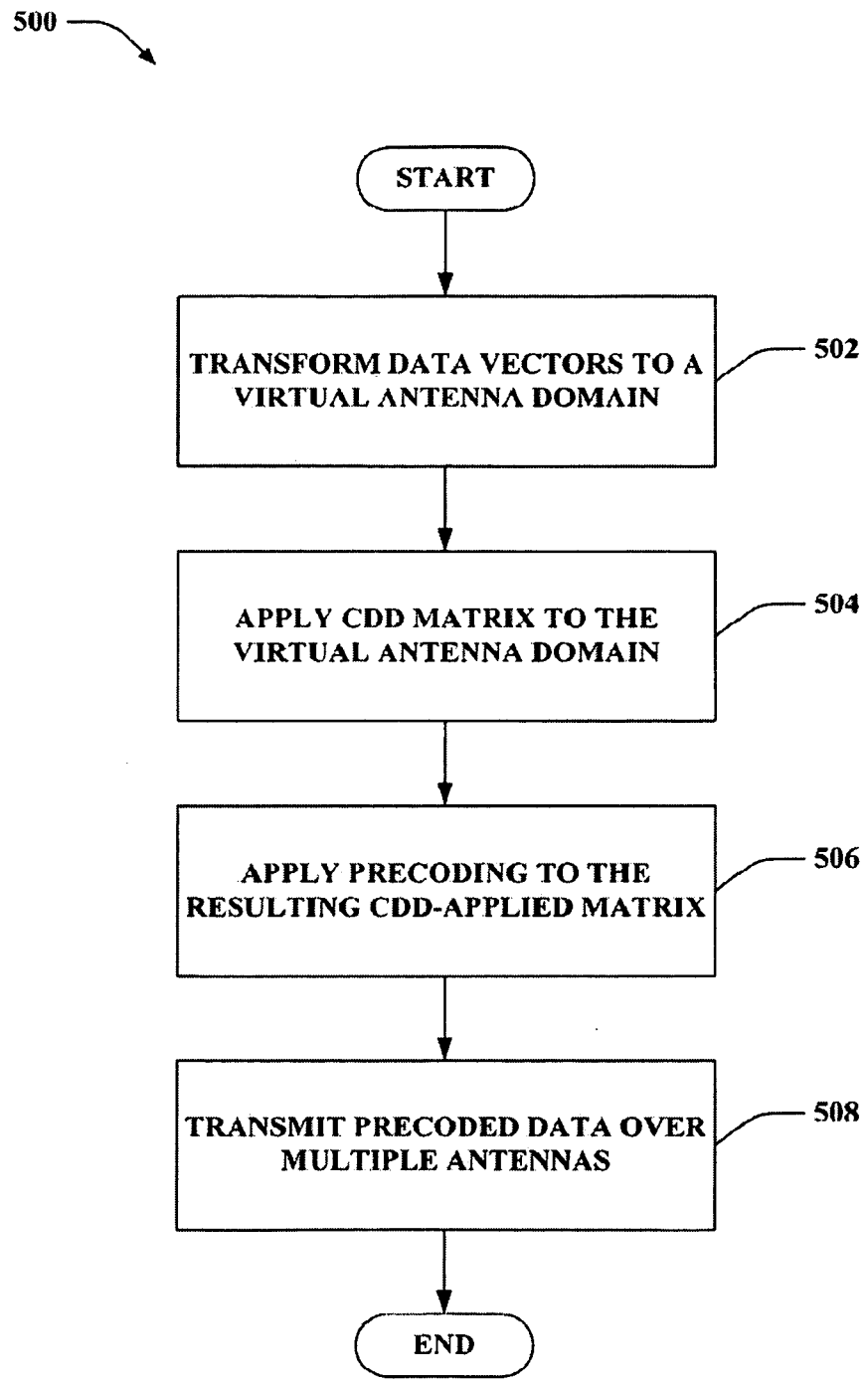
FIG. 5 is an illustration of an example methodology that facilitates applying CDD and precoding to wireless transmissions.
Figure 6:
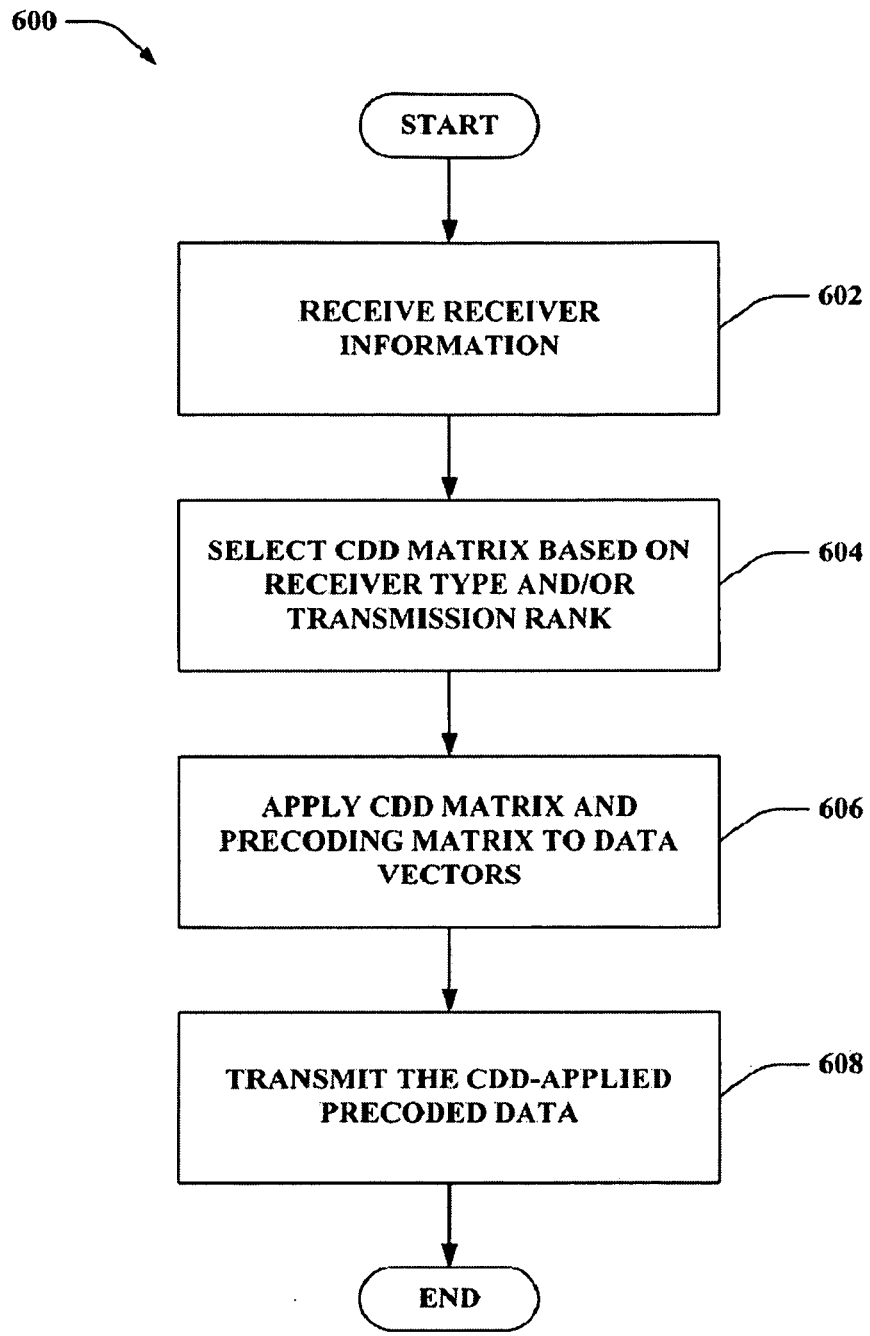
FIG. 6 is an illustration of an example methodology that facilitates selecting appropriate CDD and precoding matrices to apply to wireless communications.

Referring to FIGS. 5-6, methodologies relating to performing precoding over CDD-applied data in a virtual antenna domain are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Turning to FIG. 5, illustrated is a methodology 500 that facilitates applying CDD and precoding to data transformed to a virtual antenna domain. At 502, data vectors can be transformed to a virtual antenna domain. For example, as described, the data vectors can relate to a number of layers representing a number of receive antennas and/or transmission rank. The vectors can be transformed to a number of virtual antennas to allow further operation thereon. This can be accomplished by utilizing one or more unitary matrices and/or inverse transposes thereof, for example. At 504, a CDD matrix can be applied to the virtual antenna domain. The CDD matrix can be utilized to introduce spatial diversity among the data vectors such that the vectors can be later transmitted repetitiously with delay at each repetition to increase likelihood of successful receipt.

At 506, precoding can be applied to the resulting CDD-applied matrix. The precoding matrix, for example, can allow for beamforming the data in the CDD-applied matrix over a number of transmit antennas as described. It is to be appreciated that the number of transmit antennas can be different from the number of receive antennas. At 508, the precoded data is transmitted over multiple antennas. As the precoding is performed subsequent CDD application, signal space related to the receive antennas can be retained preventing wasted energy poured in a null space when the number of receive antennas is less than the number of transmit antennas.

Now referring to FIG. 6, a methodology 600 that facilitates selecting matrices to apply to virtual antenna data is illustrated. At 602, information can be received regarding a receiver. For example, the information can include a receiver type (such as SIC, LMMSE, and/or the like) as well as a number of receive antennas and/or transmission rank. At 604, a CDD matrix, or a matrix thereof (e.g., unitary and/or delay matrix), can be selected based on receiver type and/or transmission rank. Thus, as described above, the CDD matrix can comprise a Hermitian matrix of a unitary matrix where the receiver is LMMSE, for example. Additionally, the CDD matrix can comprise a delay matrix with diagonal values according to the transmission rank in one example. At 606, the selected CDD and precoding matrices can be applied to data vectors. As mentioned, the data vectors can relate to data to be received by a number of antennas. A portion of the CDD matrix can comprise a unitary matrix (and/or a Hermitian matrix thereof) to transform the vectors to a virtual antenna domain for applying the CDD delay matrix. The precoding matrix can be applied to steer transmissions related to the data, and at 608, the CDD-applied precoded data can be transmitted.

It will be appreciated that, in accordance with one or more aspects described herein, inferences can be made regarding selecting CDD and/or precoding matrices as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 7:
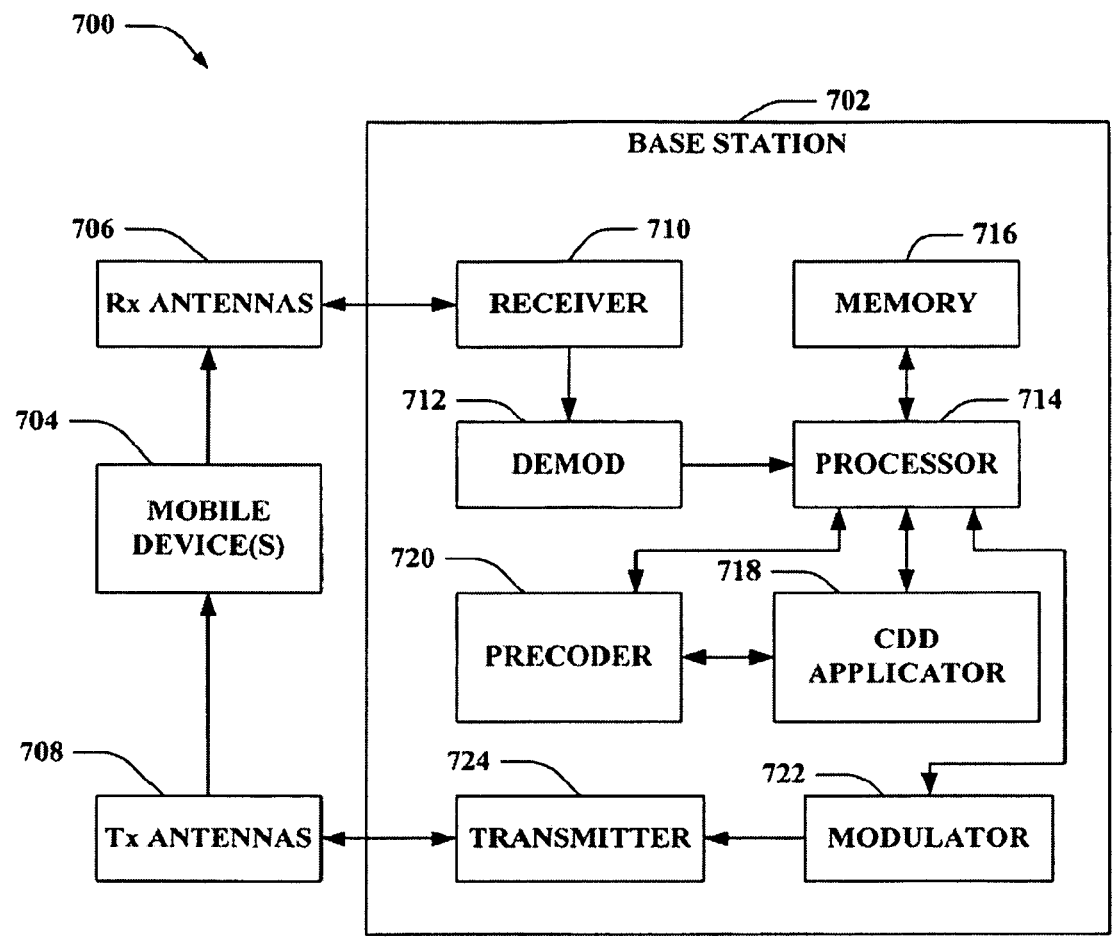
FIG. 7 is an illustration of an example system that facilitates applying CDD and precoding to wireless transmissions.

FIG. 7 is an illustration of a system 700 that facilitates applying CDD and precoding to transmissions using a virtual antenna domain. The system 700 comprises a base station 702 (e.g., access point, . . . ) with a receiver 710 that receives signal(s) from one or more mobile devices 704 through a plurality of receive antennas 706, and a transmitter 724 that transmits to the one or more mobile devices 704 through a transmit antenna 708. Receiver 710 can receive information from receive antennas 706 and is operatively associated with a demodulator 712 that demodulates received information. Demodulated symbols are analyzed by a processor 714 which is coupled to a memory 716 that stores information related to estimating a signal (e.g., pilot) strength and/or interference strength, data to be transmitted to or received from mobile device(s) 704 (or a disparate base station (not shown)), and/or any other suitable information related to performing the various actions and functions set forth herein.

Processor 714 can be a processor dedicated to analyzing information received by receiver 710 and/or generating information for transmission by a transmitter 724, a processor that controls one or more components of base station 702, and/or a processor that both analyzes information received by receiver 710, generates information for transmission by transmitter 724, and controls one or more components of base station 702.

Base station 702 can additionally comprise memory 716 that is operatively coupled to processor 714 and that can store data to be transmitted, received data, information related to available channels, data associated with analyzed signal and/or interference strength, information related to an assigned channel, power, rate, or the like, and any other suitable information for estimating a channel and communicating via the channel. Memory 716 can additionally store protocols and/or algorithms associated with estimating and/or utilizing a channel (e.g., performance based, capacity based, etc.).

It will be appreciated that the memory 716 described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 708 of the subject systems and methods is intended to comprise, without being limited to, these and any other suitable types of memory.

Processor 714 is further coupled to a CDD applicator 718 that can effectuate CDD with respect to data for transmission by applying one or more matrices to the data. For example, the CDD applicator 718 can apply a unitary matrix to a plurality of data vectors related to a number of receive antennas of mobile device(s) 704, or a transmission rank thereof, to apply the data in a virtual antenna domain. The CDD applicator 718 can additionally apply a CDD delay matrix to introduce spatial diversity over the virtual antennas. Furthermore, the processor can be coupled to a precoder 720 that can apply a precoding matrix to the CDD-applied data to beamform the data for transmission over the transmit antennas 708. Furthermore, although depicted as being separate from the processor 714, it is to be appreciated that the CDD applicator 718, precoder 720, demodulator 712, and/or modulator 722 can be part of the processor 714 or multiple processors (not shown).

Figure 8:
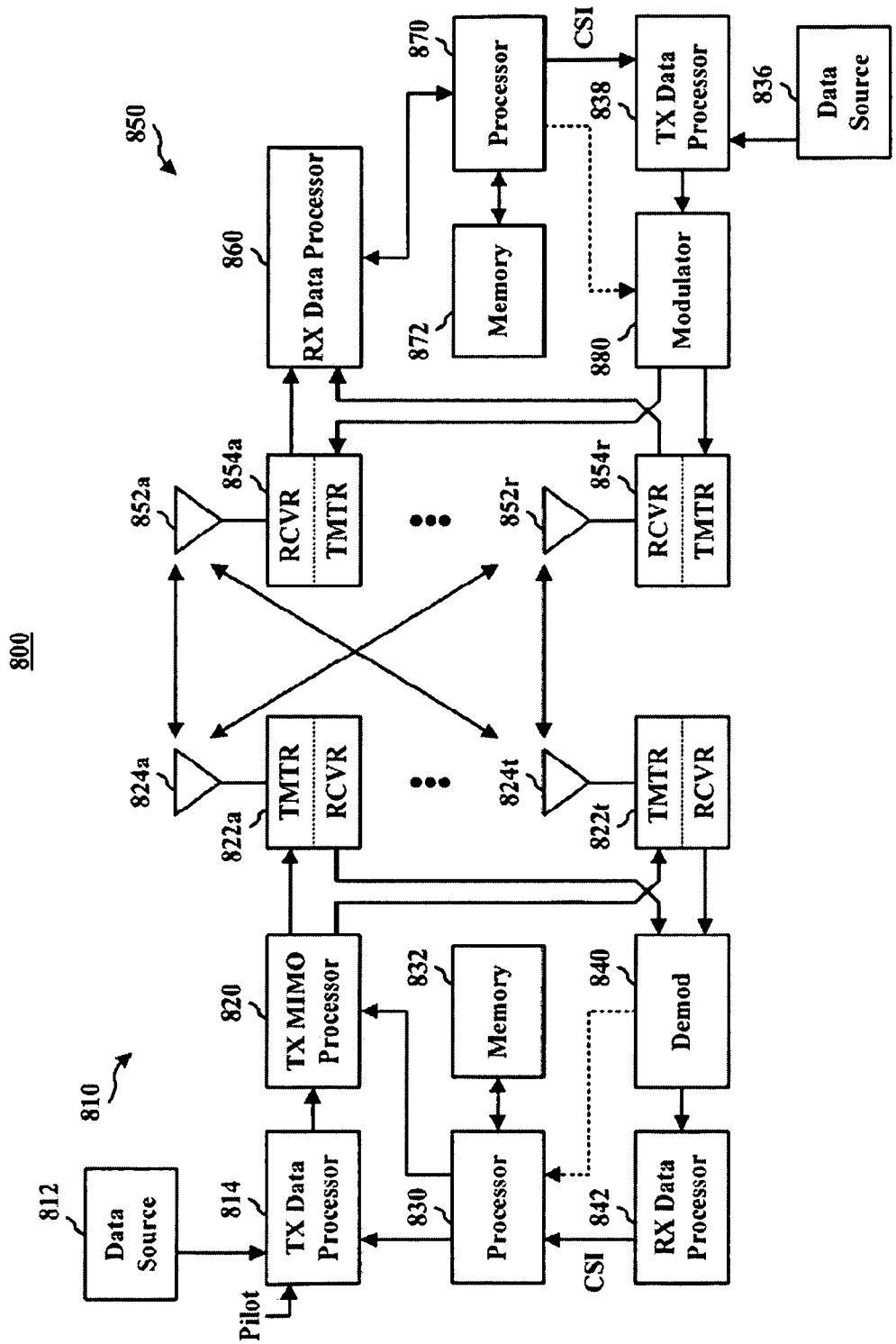
FIG. 8 is an illustration of an example wireless network environment that can be employed in conjunction with the various systems and methods described herein.

FIG. 8 shows an example wireless communication system 800. The wireless communication system 800 depicts one base station 810 and one mobile device 850 for sake of brevity. However, it is to be appreciated that system 800 can include more than one base station and/or more than one mobile device, wherein additional base stations and/or mobile devices can be substantially similar or different from example base station 810 and mobile device 850 described below. In addition, it is to be appreciated that base station 810 and/or mobile device 850 can employ the systems (FIGS. 1-3 and 7), operations (FIG. 4) and/or methods (FIGS. 5-6) described herein to facilitate wireless communication there between.

At base station 810, traffic data for a number of data streams is provided from a data source 812 to a transmit (TX) data processor 814. According to an example, each data stream can be transmitted over a respective antenna. TX data processor 814 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 850 to estimate channel response. The multiplexed pilot and coded data for each data stream can be modulated (e.g., symbol mapped) based on a particular modulation scheme (e.g. binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 830.

The modulation symbols for the data streams can be provided to a TX MIMO processor 820, which can further process the modulation symbols (e.g., for OFDM). TX MIMO processor 820 then provides $N_T$ modulation symbol streams to $N_T$ transmitters (TMTR) 822a through 822t. In various embodiments, TX MIMO processor 820 applies beamforming weights to the symbols of the data streams and to the antenna from which the symbol is being transmitted.

Each transmitter 822 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 822a through 822t are transmitted from $N_T$ antennas 824a through 824t, respectively.

At mobile device 850, the transmitted modulated signals are received by $N_R$ antennas 852a through 852r and the received signal from each antenna 852 is provided to a respective receiver (RCVR) 854a through 854r. Each receiver 854 conditions (e.g., filters, amplifies, and downconverts) a respective signal, digitizes the conditioned signal to provide samples, and further processes the samples to provide a corresponding "received" symbol stream.

An RX data processor 860 can receive and process the $N_R$ received symbol streams from $N_R$ receivers 854 based on a particular receiver processing technique to provide $N_T$ "detected" symbol streams. RX data processor 860 can demodulate, deinterleave, and decode each detected symbol stream to recover the traffic data for the data stream. The processing by RX data processor 860 is complementary to that performed by TX MIMO processor 820 and TX data processor 814 at base station 810.

A processor 870 can periodically determine which precoding matrix to utilize as discussed above. Further, processor 870 can formulate a reverse link message comprising a matrix index portion and a rank value portion.

The reverse link message can comprise various types of information regarding the communication link and/or the received data stream. The reverse link message can be processed by a TX data processor 838, which also receives traffic data for a number of data streams from a data source 836, modulated by a modulator 880, conditioned by transmitters 854a through 854r, and transmitted back to base station 810.

At base station 810, the modulated signals from mobile device 850 are received by antennas 824, conditioned by receivers 822, demodulated by a demodulator 840, and processed by a RX data processor 842 to extract the reverse link message transmitted by mobile device 850. Further, processor 830 can process the extracted message to determine which precoding matrix to use for determining the beamforming weights.

Processors 830 and 870 can direct (e.g., control, coordinate, manage, etc.) operation at base station 810 and mobile device 850, respectively. Respective processors 830 and 870 can be associated with memory 832 and 872 that store program codes and data. Processors 830 and 870 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 9:
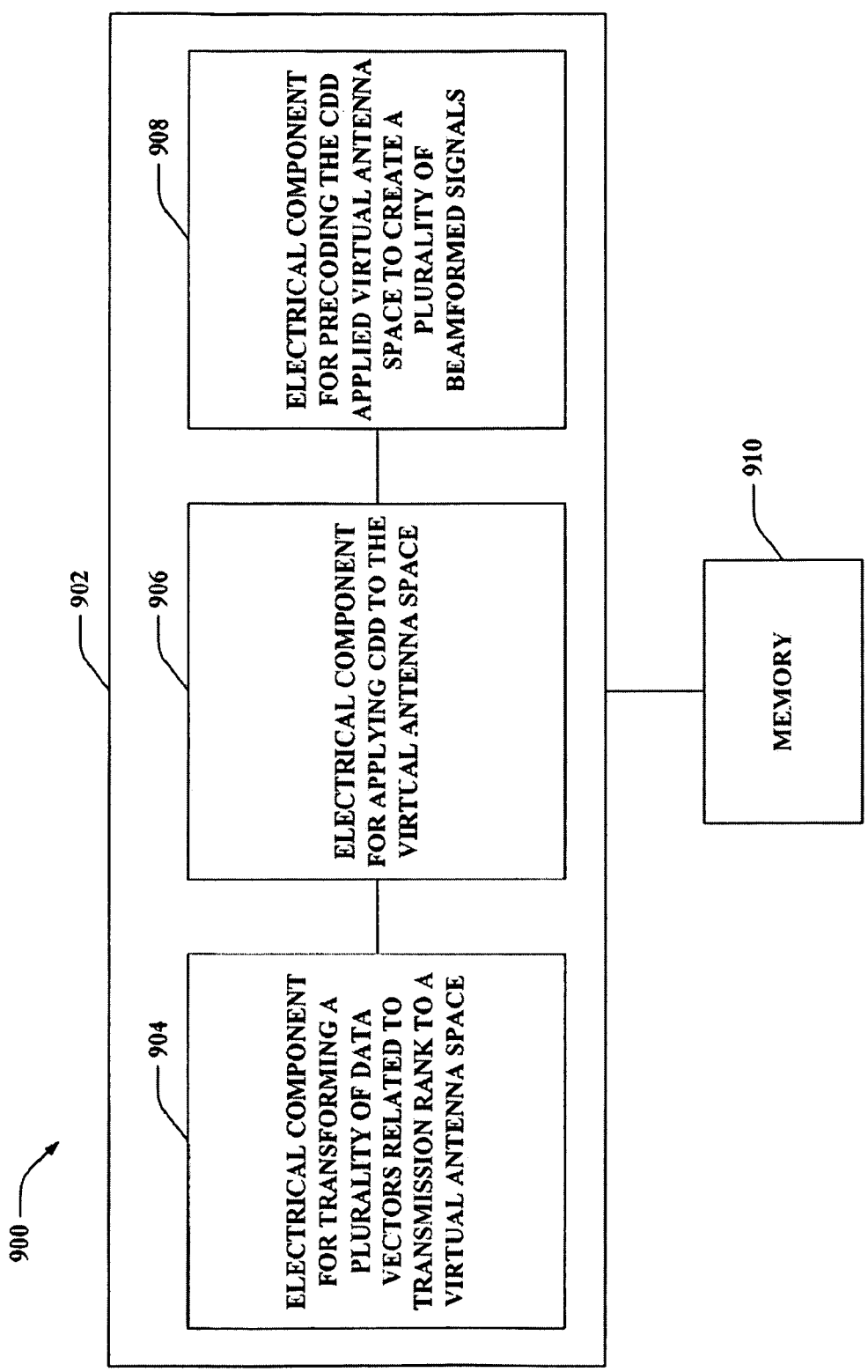
FIG. 9 is an illustration of an example system that applies CDD and precoding to wireless transmissions.

With reference to FIG. 9, illustrated is a system 900 that facilitates applying CDD and precoding to wireless transmissions. For example, system 900 can reside at least partially within a base station, mobile device, etc. It is to be appreciated that system 900 is represented as including functional blocks, which can be functional blocks that represent functions implemented by a processor, software, or combination thereof (e.g., firmware). System 900 includes a logical grouping 902 of electrical components that can act in conjunction. For instance, logical grouping 902 can include an electrical component for transforming a plurality of data vectors related to transmission rank to a virtual antenna space 904. For example, the data vectors can comprise data to be transmitted to a number of receive antennas based on the transmission rank. In an example, the data vectors can be transformed to the virtual antenna space utilizing a unitary matrix as described; additionally, a Hermitian matrix of the unitary matrix can be used to mitigate throughput loss caused by the unitary matrix. Further, logical grouping 902 can comprise an electrical component for applying CDD to the virtual antenna space 906. In one example, this can include applying a CDD delay matrix to the transformed data vectors. The CDD delay matrix can be selected based on the transmission rank and/or a type of receiver, for example, or other desired properties. Moreover, logical grouping 902 can comprise an electrical component for precoding the CDD applied virtual antenna space to create a plurality of beamformed signals 908. Thus, as mentioned, the precoder can be applied after CDD to maintain beneficial aspects of precoding, such as steering transmissions or other designed properties. Additionally, system 900 can include a memory 910 that retains instructions for executing functions associated with electrical components 904, 906, and 908. While shown as being external to memory 910, it is to be understood that one or more of electrical components 904, 906, and 908 can exist within memory 910.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of a wireless communications apparatus that facilitates applying cyclic delay diversity (CDD) and precoding to wireless transmissions, comprising:
   transforming a plurality of data vectors related to antennas of a receiver to a virtual antenna domain;
   applying a CDD matrix to the plurality of data vectors to produce a spatial diversity matrix; and
   applying a precoding matrix to the spatial diversity matrix to construct a plurality of directional data beams corresponding to a number of transmit antennas,
   wherein the CDD matrix includes a CDD delay matrix selected based at least in part on a transmission rank related to the plurality of data vectors to prevent transmission energy from pouring in a null space upon transmission of beamformed signals.

2. The method of claim 1, wherein the transforming the data vectors to the virtual antenna domain is accomplished by applying a unitary matrix to the data vectors where the dimensions of the unitary matrix are related to the number of data vectors.

3. The method of claim 2, further including applying a Hermitian inverse transpose matrix of the unitary matrix to the data vectors based at least in part on a type of the receiver.

4. The method of claim 1, further including selecting the CDD matrix based at least in part on a type of the receiver, the number of antennas of the receiver, or the plurality of data vectors.

5. The method of claim 1, further including selecting a phase increment applied to the CDD matrix to configure a size of spatial diversity effectuated by applying the spatial diversity matrix.

6. The method of claim 1, wherein the number of transmit antennas varies from the number of antennas of the receiver or the plurality of data vectors.

7. The method of claim 1, further including:
   applying an inverse fast Fourier transform (IFFT) to the directional data beams to create one or more OFDM symbols related thereto; and
   adding a cyclic prefix (CP) to the one or more OFDM symbols.

8. The method of claim 7, further including transmitting the OFDM symbols over the plurality of transmit antennas according to the related directional data beam.

9. A wireless communications apparatus, comprising:
   at least one processor configured to transform a plurality of data vectors to a virtual antenna domain and apply cyclic delay diversity (CDD) and precoding matrices thereover to create a plurality of beamformed signals; and a memory coupled to the at least one processor, wherein to apply the CDD, the at least one processor is configured to multiply the plurality of data vectors by a CDD delay matrix selected based at least in part on a transmission rank related to the plurality of data vectors to prevent transmission energy from pouring in a null space upon transmission of the plurality of beamformed signals.

10. The wireless communications apparatus of claim 9, wherein the at least one processor is further configured to transmit the beamformed signals over a plurality of transmit antennas.

11. The wireless communications apparatus of claim 9, wherein the plurality of data vectors are transformed to the virtual antenna domain at least in part by applying a unitary matrix over the plurality of data vectors.

12. The wireless communications apparatus of claim 11, wherein the CDD matrix is applied over the unitary matrix to introduce spatial diversity thereto.

13. The wireless communications apparatus of claim 12, wherein the precoding is applied to a matrix produced from applying the CDD matrix to create the beamformed signals.

14. The wireless communications apparatus of claim 9, wherein the at least one processor is further configured to select the CDD matrix based at least in part on a type of a receiver that receives the plurality of beamformed signals.

15. The wireless communications apparatus of claim 14, wherein the receiver is a linear minimum mean-square error (LMMSE) receiver and the CDD matrix includes a Hermitian matrix of a unitary matrix utilized to transform the data vectors to the virtual antenna domain.

16. The wireless communications apparatus of claim 9, wherein a number of antennas used to transmit the beamformed signals exceeds a number of antennas to receive the beamformed signals or a number of the plurality of data vectors.

17. A wireless communications apparatus that facilitates applying cyclic delay diversity (CDD) and precoding to wireless transmissions, comprising:
    means for transforming a plurality of data vectors related to transmission rank to a virtual antenna space;
    means for applying CDD to the virtual antenna space; and
    means for precoding the CDD applied virtual antenna space to create a plurality of beamformed signals,
    wherein the means for applying the CDD multiplies the plurality of data vectors by a CDD delay matrix selected based at least in part on the transmission rank to prevent transmission energy from pouring in a null space upon transmission of the plurality of beamformed signals.

18. The wireless communications apparatus of claim 17, further including means for transmitting the beamformed signals over a plurality of transmit antennas.

19. The wireless communications apparatus of claim 18, wherein the number of antennas is greater than the transmission rank.

20. The wireless communications apparatus of claim 17, wherein the CDD delay matrix is further selected based at least in part on a type of receiver to receive the beamformed signals.

21. The wireless communications apparatus of claim 17, wherein the means for transforming the data vectors utilizes a unitary matrix to create the virtual antenna space.

22. A wireless communications apparatus that facilitates applying cyclic delay diversity (CDD) and precoding to wireless transmissions, comprising:
    means for transforming a plurality of data vectors related to transmission rank to a virtual antenna space, wherein the means for transforming the data vectors utilizes a unitary matrix to create the virtual antenna space;
    means for applying CDD to the virtual antenna space;
    means for precoding the CDD applied virtual antenna space to create a plurality of beamformed signals; and
    means for applying a Hermitian matrix of the unitary matrix to mitigate performance loss caused by the unitary matrix utilization.

23. A computer program product for operating a wireless communications apparatus, comprising:
    a non-transitory computer-readable medium comprising:
    code for causing at least one computer to transform a plurality of data vectors related to antennas of a receiver to a virtual antenna domain;
    code for causing the at least one computer to apply a cyclic delay diversity (CDD) matrix to the plurality of data vectors to produce a spatial diversity matrix; and
    code for causing the at least one computer to apply a precoding matrix to the spatial diversity matrix to construct a plurality of directional data beams corresponding to a number of transmit antennas,
    wherein the CDD matrix includes a CDD delay matrix selected based at least in part on a transmission rank related to the plurality of data vectors to prevent transmission energy from pouring in a null space upon transmission of beamformed signals.

24. The computer program product of claim 23, wherein the CDD delay matrix is further selected based at least in part on a type of receiver to receive the beamformed signals.

* * * * *